J. M. KLINGELSMITH.
SYSTEM OF ELECTRIC VEHICLE OPERATION.
APPLICATION FILED NOV. 26, 1913.

1,335,243.

Patented Mar. 30, 1920.
4 SHEETS—SHEET 1.

WITNESSES:

INVENTOR:
JOSEPH M. KLINGELSMITH
By Hirschl & Hirschl
ATTORNEYS

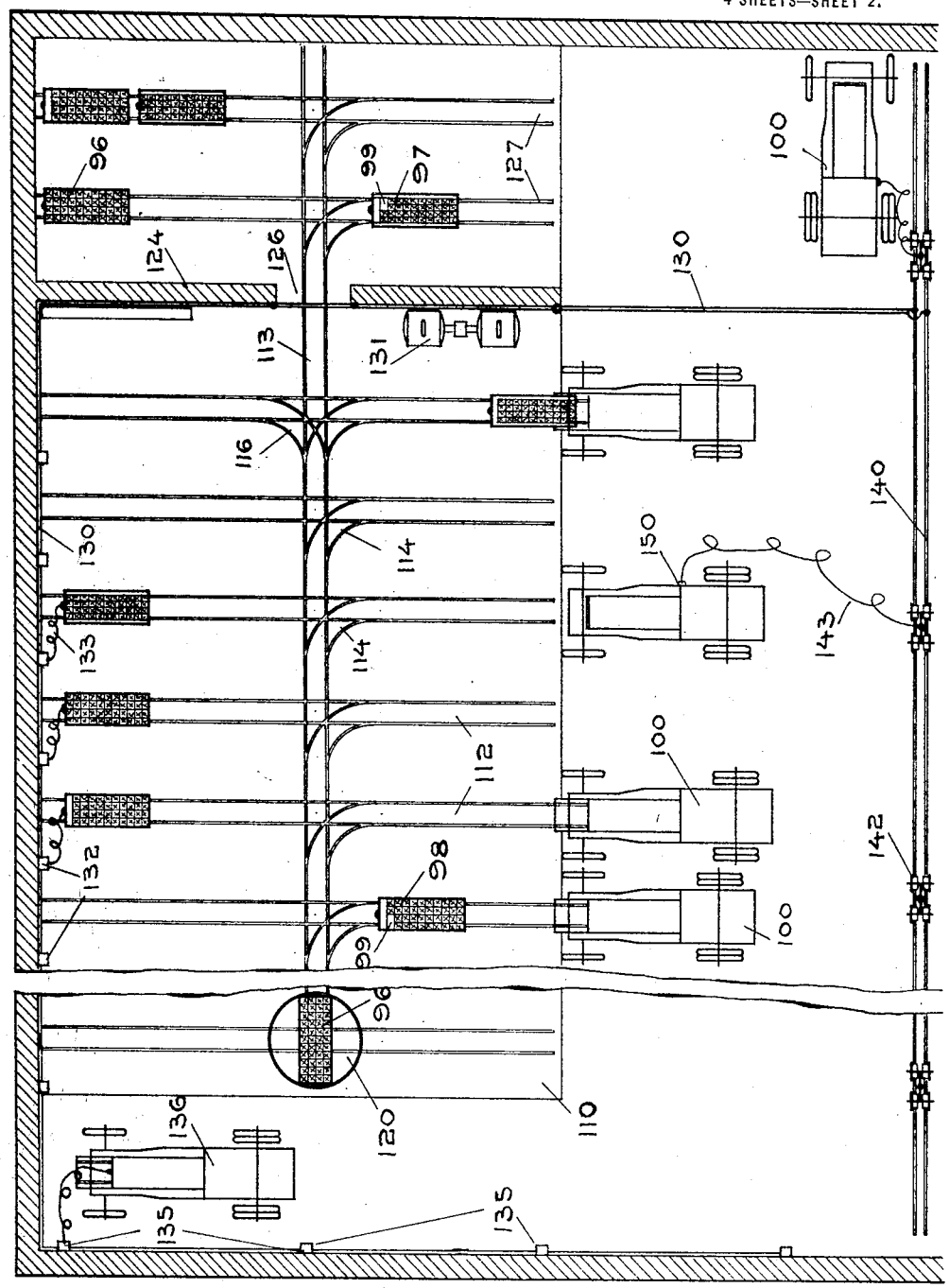

J. M. KLINGELSMITH.
SYSTEM OF ELECTRIC VEHICLE OPERATION.
APPLICATION FILED NOV. 26, 1913.
1,335,243.
Patented Mar. 30, 1920.
4 SHEETS—SHEET 3.
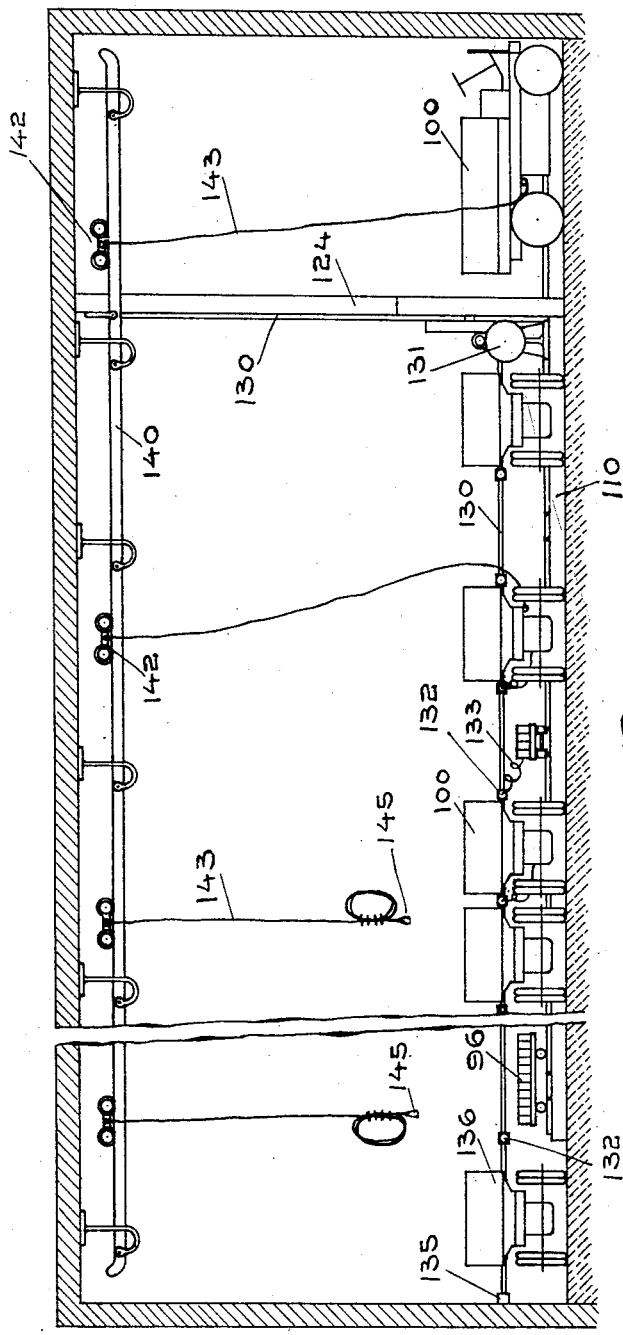
WITNESSES:
F. H. Sintjow
Lillian E. Christianson.
INVENTOR:
Joseph M. Klingelsmith
BY Hirschl & Hirschl.
ATTORNEYS J. M. KLINGELSMITH.
SYSTEM OF ELECTRIC VEHICLE OPERATION.
APPLICATION FILED NOV. 26, 1913.
1,335,243.
Patented Mar. 30, 1920.
4 SHEETS—SHEET 4.
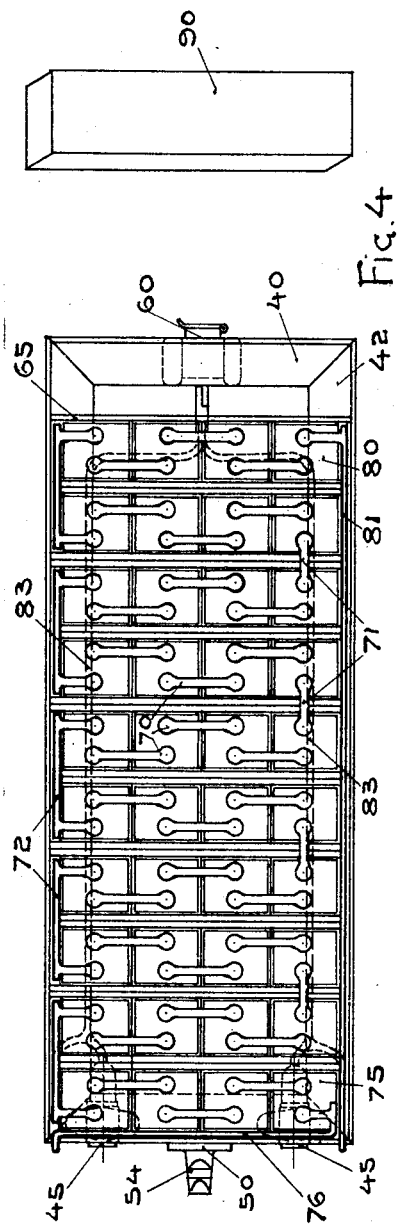
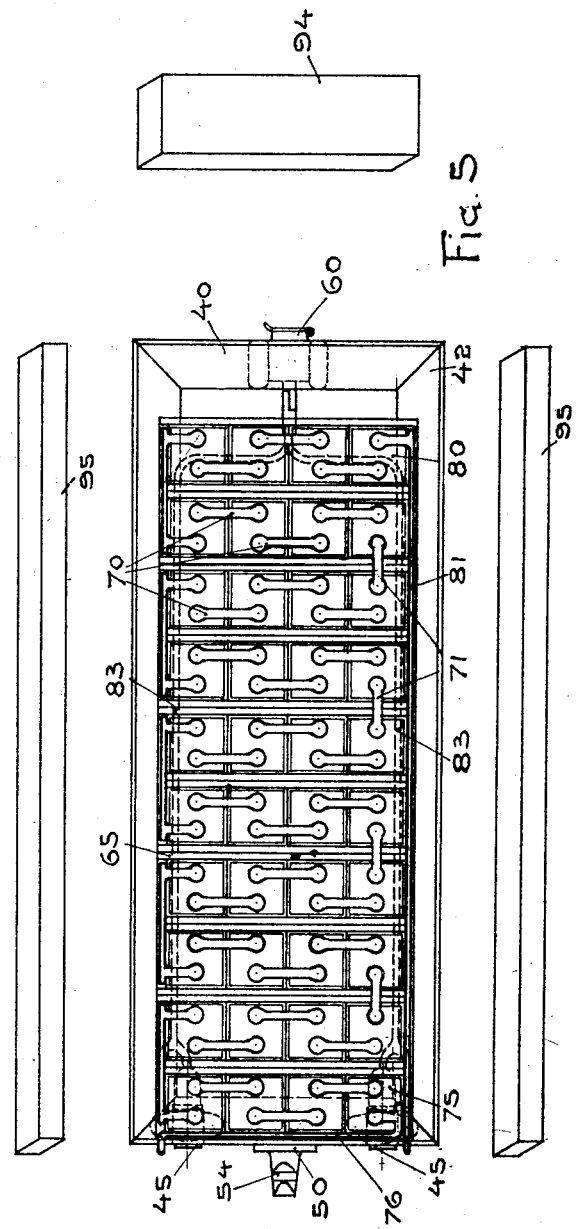
WITNESSES:
INVENTOR:
Joseph M. Klingelsmith
BY Hirschl & Hirschl,
ATTORNEYS

UNITED STATES PATENT OFFICE.

JOSEPH M. KLINGELSMITH, OF CHICAGO, ILLINOIS, ASSIGNOR TO KLINGELSMITH ELECTRIC TRUCK COMPANY, OF CHICAGO, ILLINOIS, A CORPORATION OF MAINE.

SYSTEM OF ELECTRIC-VEHICLE OPERATION.

1,335,243.  Specification of Letters Patent.  Patented Mar. 30, 1920.

Application filed November 26, 1913. Serial No. 803,140.

*To all whom it may concern:*

Be it known that I, JOSEPH M. KLINGELSMITH, a citizen of the United States, residing at the Warner Hotel, 33rd St. and Cottage Grove Ave., in Chicago, county of Cook, and State of Illinois, have invented new and useful Improvements in Systems of Electric-Vehicle Operation, of which the following is a specification.

Among engineers and others connected with the motor car industry it has long been recognized that the electrically propelled vehicle has many inherent advantages over other mechanically propelled vehicles and in particular that the electric car is especially adapted for work in congested traffic and other places where frequent starts and stops are necessary. Because of its high torque at low speed the electric motor is particularly suited for quick acceleration which is necessary under such conditions; and where initial cost, cost of maintenance, and cost of operation are also carefully considered, as in the case of commercial vehicles, the demand is also great for a power vehicle which is low in first cost, which will operate with a maximum efficiency at different speeds, and which is low in its maintenance cost. The electric vehicle answers these requirements and in addition has such other advantages as adaptability to all conditions of weather and temperature; quietness of running, which is simply another manifestation of its mechanical efficiency; and simplicity in construction and operation.

The single disadvantage of the electric vehicle has always been its limited mileage on a battery charge, which is, of course, due to the great weight of battery necessary for a given output, and the practical limits which are reached in the size and weight of the battery equipment. Vehicles, of course, have been built with batteries of great capacity, but at the expense of great weight; which means increased cost of operation in carrying around the extra dead weight, and increased maintenance cost because of the extra load on the frame, axles and other parts of the vehicle, in addition to the increased maintenance cost of the battery itself; and such a vehicle is necessarily limited in the proportion of its carrying capacity to its own weight.

A battery of large capacity and consequent long discharge rate also requires a proportionately longer charging time, so that a vehicle so equipped suffers the same disadvantage as a vehicle with a smaller battery, of idle periods for charging during which the interest on the investment is being lost. Attempts have been made to overcome this last disadvantage by "boosting" a battery on charge, or charging it at a very high charging rate; with consequent injury to the battery and therefore higher maintenance cost and shorter life. In the operation of an electric vehicle, time is also lost in giving the batteries the care and attention which they require in addition to the charging, such as washing the plates, renewing electrolyte, flushing, etc., and some of the time consumed in these operations is usually lost in removing batteries from their more or less inaccessible positions in the vehicles and in again replacing them.

In order to overcome some of the foregoing disadvantages attendant upon the operation of an electric vehicle and in order to increase its range of operation and usefulness and efficiency the present invention contemplates the construction of a vehicle with a battery designed to be readily removable and interchangeable in the vehicle so that a discharged battery can be quickly taken out of the vehicle and replaced by a fully charged one, with practically no loss of time in the running of the vehicle. A vehicle so designed and equipped with a readily removable battery can work continuously on scheduled trips, and battery stations can be arranged where the vehicle may be supplied with a fresh battery as often as necessary, so that it may be kept in continuous operation; while the dead weight of battery equipment which it carries constantly can be reduced to a minimum, since battery charges can be arranged as desired. In such case also, if unusual traffic conditions, such as snow or deep mud cause an extra power consumption, a larger battery may be supplied, or additional battery replacements may be made to suit such conditions, still without material sacrifice in the running time of the vehicle.

In addition a battery which can be readily removed from the vehicle and is designed to be charged outside of the vehicle can be charged at a low charging rate without sacrificing the running time of the vehicle, with consequent increase in the life and power efficiency of the battery and decrease in its maintenance cost, and can also receive better care and attention in the washing and replacement of plates, renewal of electrolyte, flushing, etc., than a battery which remains in an inaccessible position in a vehicle and is available for inspection, care and attention only during such times as the vehicle can be withdrawn from its service on the road; and if battery renewals can be readily made without interfering with the use of the vehicle, the batteries need not ordinarily be discharged beyond the point of their best power and maintenance efficiency, but can be removed for replacement by fresh ones when only partially discharged.

The complete system therefore includes one or more vehicles and batteries for such vehicles in such number that while the vehicles are kept in operation on the road as long as may be profitable some of the batteries may be kept in reserve fully charged or in process of being charged for replacement of the batteries which are in use; and preferably also where the system is sufficiently large to include a considerable number of vehicles, which may be of different load capacities, and a considerable number of batteries, the latter may embrace units of different sized cells, and different numbers of cells, so that batteries may be provided of differing ampere-hour output, and of different voltage. These batteries however are assembled in such manner that they may be interchangeable in all of the vehicles included in the system so that any one vehicle may receive any battery. The purpose of this arrangement is that where large capacity and small capacity vehicles are operated together, which would ordinarily be provided with batteries proportioned to their load capacities, the batteries may be nevertheless interchangeable so that if the smaller vehicle should be required to perform an extra heavy service on some occasion it might be sent out with the larger capacity battery; and conversely if the larger vehicle should be required to perform a short haul or other light service, or if it were otherwise desirable, or necessary to meet an emergency, the larger vehicle could be sent out with the smaller battery. In other cases where additional speed might be desired for a particular service a battery of larger voltage than that ordinarily used might be supplied for one of the vehicles; and in cases where a high discharge rate might be necessary, as for example, in climbing hills or operating through mud, snow, or other heavy traffic conditions, a battery of larger cells would be desirable. In some cases also a vehicle might be kept in continuous operation performing two kinds of service, as for example, it might be started out each morning on a long haul, and returning, might leave again in the afternoon on a short haul. In such case, then, it could be equipped in the morning with a large battery, or one with large cells; and starting out again in the afternoon the large battery could be replaced by a smaller one in the vehicle and placed on charge to remain all the rest of the day and all night if necessary; while the vehicle returning in the evening might leave its small battery to be also charged during the night, or to be charged the following morning while the large battery would be in service on the road.

A complete system for such electric vehicle operation, comprising as separate units a number of electric vehicles and a number of batterits assembled in such manner as to be adapted for ready insertion into the vehicles and withdrawal therefrom, and the means for inserting and withdrawing the batteries, moving them about, charging, handling, caring for, and storing them, and the means for housing and caring for the vehicles, with and without their batteries, is shown in the accompanying drawings in which;

Fig. 2 is a view largely diagrammatic showing the complete system in top plan view.

Fig. 3 is a similar view in front elevation.

Fig. 4 is a top plan view showing one of the batteries assembled in a battery truck; and removed therefrom and in perspective, a filling block for use in connection with such a battery.

Fig. 5 is a similar view showing a smaller battery, a similar filling block, and additional blocks for use in connection with such smaller battery.

Figure 1:
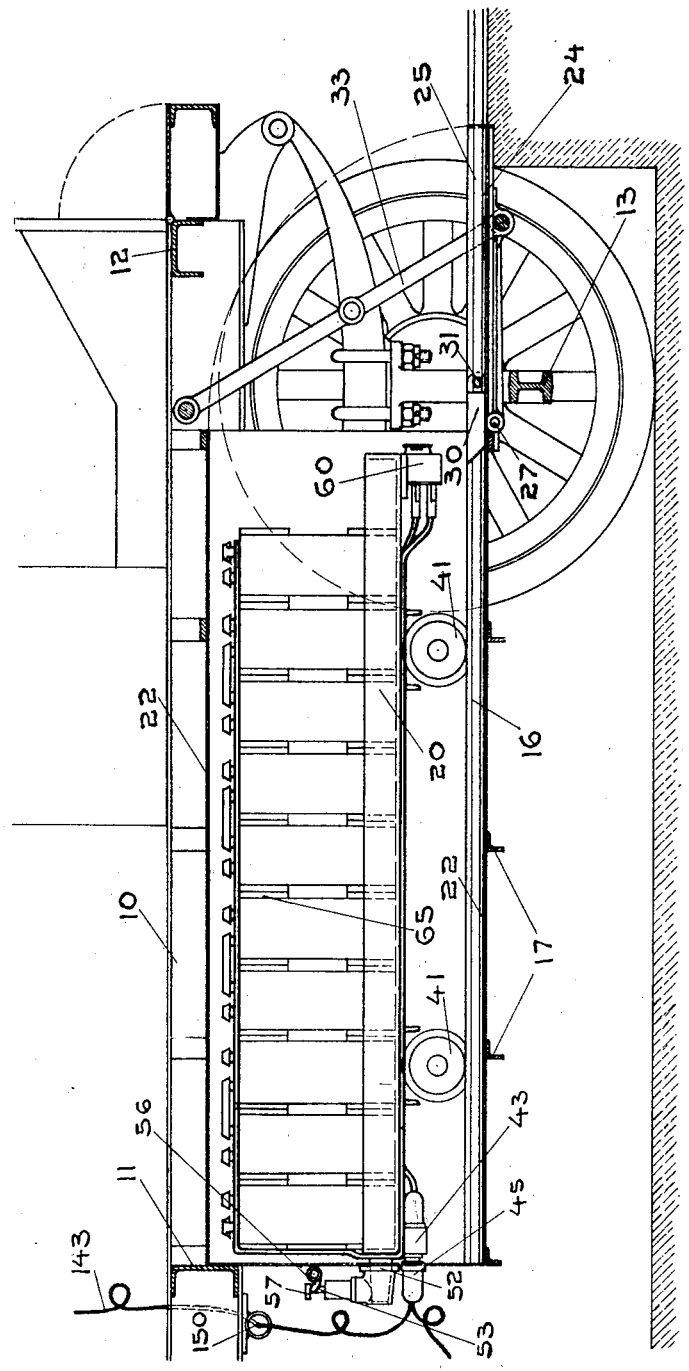
Figure 1 is a view showing the forward part of one of the vehicles in longitudinal vertical section.

As shown in said drawings the complete system comprises a number of vehicles one of which is illustrated in Fig. 1, such vehicle including a frame of longitudinal members 10 and cross members 11, 12, which rests on a front axle 13. From the frame members 10 and 11 are hung horizontal rails 16, by means of depending angle members, 17, and such rails are designed to carry the weight of the battery which is mounted in a small car or truck 20. The angle members 17 and the rails 16 are joined by sheet metal plates 22 which thus form a housing or battery compartment for the battery and battery car, and the front end of such housing is closed by a horizontally pivoted door 24 which can be let down like a draw bridge and is provided with rails 25, in continuation of the rails 16 when the door is in its lowered position. The door is pivoted or hinged at points below the rails 16 and 25, as indicated at 27, and in order to permit of its folding upward into its vertical position gaps are left between the adjacent ends of the rails 16 and 25, which gaps are closed by bridge pieces 30. The latter are pivoted at their forward ends to the rails 25, as indicated at 31, and their rear ends meet the forward ends of the rails 16 in beveled surfaces so that when the door 24 is raised they will slide up over the ends of the rails 16, and will return to their horizontal position when the door is again lowered. The door in its horizontal position is supported by diagonal braces 33.

The battery truck or car 20 comprises a horizontal frame 40 mounted on flanged wheels 41 which rest on the rails 16, and having inwardly directed lower horizontal flanges 42 upon which are placed the trays of cells comprising the battery; such trays being set crosswise within the frame 40 and resting on the horizontal bottom flanges 42. At two separated points on one end of the frame 40 are placed insulated contact pieces or sockets 43 adapted for connection with corresponding plugs or contact members 45 which are fixed in the rear wall of the battery compartment of the vehicle so that by the mere operation of inserting the battery car into the battery compartment, or withdrawing it therefrom, the electrical connection may be made, or broken; it being intended that the car may be withdrawn and moved about on tracks arranged for the purpose, as hereinafter described. In the middle of the same end of the battery car is fixed a large wedge-shaped stud or boss 50 which enters a correspondingly shaped recess or socket in a part 52 which is likewise fixed to the rear wall of the battery compartment; such stud 50 being locked therein by means of a vertical bolt or plunger 53 which enters a notch 54 in the upper side of the stud. The bolt 53 may be withdrawn to unlock the device and release the car by means of a curved finger or lever 56 which engages under a flange or button 57 on its upper end. At the opposite end of the battery car is placed a charging socket 60 which may be of any approved form, for the purpose of connecting the battery to a charging plug in the manner commonly employed for charging an electric vehicle.

The complete battery, comprising the separate cells arranged in wooden trays 65 in the manner heretofore commonly employed, and the trays mounted crosswise in the battery car and resting on the horizontal flange or ledge 41, is shown in Fig. 4; where all of the cells are shown connected in series by means of the connectors 70, 71 and 72, one of the end cells, 75, is shown connected by means of a wire or cable 76 with one of the contact sockets 45, and the other end cell, 80, is shown connected by a cable 81 with the opposite contact socket 45. In addition, two cables 83, 83, are connected in parallel to the two cables 76 and 81 and are led to the charging socket 60. The battery illustrated in Fig. 4 is formed of forty cells of the largest capacity adapted for use in this system and the battery car is accordingly made of such width that when these cells are arranged in their trays and the trays set crosswise in the car they will completely occupy the horizontal width of the car; but the car is of such length that the ten trays will not occupy its entire length and accordingly the blank space at the end of the car is filled with a block 90 in order to prevent the trays from sliding endwise.

Similarly in Fig. 5 is illustrated an arrangement of a battery having the same number of cells as shown in Fig. 4 but each cell being smaller than those above described, and accordingly in such case there is provided, in addition to a block 94 for filling up the space at the end of the battery car, blocks or strips 95, 95 for placing between the ends of the trays and the sides of the car frame in order that the trays may be packed tightly into the battery car to obviate their accidental displacement. Likewise also, in Fig. 2 are indicated, diagrammatically, battery units of other capacities, but of the same linear dimensions as those above described; it being understood that by the term battery unit is meant a complete battery of cells arranged within a car or truck adapted for ready insertion into a vehicle and withdrawal therefrom, as above described, and for convenient moving about. Thus, for example, at 96, 96, are indicated battery units of the largest cells and the maximum number of cells, which completely fill the battery car without the employment of filling blocks or equivalent devices, while at 97 is indicated a battery of the smallest cells and the lowest voltage, and at 98 is indicated a battery of the same voltage, but with larger cells; the latter two battery units being completed by the addition of filling blocks 99.

In Figs. 2 and 3 is shown further a plan for the installation of a complete system comprising any number of vehicles 100, 100, any number of battery units, and means for housing and caring for the vehicles and for removing and replacing their batteries, means for charging, storing, caring for and moving the battery units about; and means also for charging the batteries in the vehicles and for moving the vehicles about without batteries. Such a system comprises a large space in which the vehicles can be moved about and adjoining it is a raised platform 110 on which is laid a system of tracks for operating the battery cars or moving the battery units about. Such tracks may be arranged to suit the particular requirements in any case but are here shown as comprising straight, parallel lengths of track 112 running from the front edge of the platform to its rear and intersected by a straight stretch of track 113 running the entire length of the platform. This latter section of tracks is connected to each of the cross tracks by means of curved sections 114, 114 so that the cars may be switched from track to track; and since the battery units are always withdrawn from the vehicles with the same end forward and are always reinserted the same way it should not ordinarily be necessary to turn a car around, although this can easily be accomplished by providing an additional curved section of track connecting one of the cross tracks with the long track 113 as, for example, the section 116; forming thereby a switch-back system for reversing one of the battery cars if this should be desired. In addition a turn table 120 may be provided at any convenient place in the system for convenience in turning a car around if this should be required at any time.

A wall 124 may separate a part of the long platform 110 at one end to form a storage room or storage space in which the battery units may be stored, and for the purpose of making this space available the track 113 is continued into the storage room through a door 126 and is similarly joined to cross tracks 127 within such room.

At the rear of the platform 110 is an electric conduit 130 which is fed by a generator 131 and supplied with outlets 132 to connect with the batteries through flexible connectors 133 for the purpose of charging them. Beyond the platform 110 and along one end of the plant the conduit 130 is shown continued and similarly provided with outlets 135 so that if desired one or more vehicles with their batteries in place may be connected to them and the batteries charged without removal from the vehicles; as indicated at 136.

Adjacent the long platform 110 there is also provided a trolley system for supplying current to the vehicles in the absence of their batteries so that they may be moved about if desired. Accordingly two parallel rails 140 are suitably suspended from above in such manner that small trolleys 142 may run on them and from these trolleys depend flexible cables 143, each cable being a double conductor with its upper ends suitably connected through the trolley to the two rails and having at its lower end a plug connection 145 to fit into a correspondingly shaped socket 150, one of which is supplied in each vehicle. As the conducting elements of this device, including the rails, the trolleys 142, and the flexible cables and connectors, are known in the art, they are not here described, but may be made in any well known manner. The sockets 150 are similar in all essential respects to the charging sockets 60 on the ends of the battery trucks and are connected to the vehicle in parallel with the two conductors leading from the sockets 45. It is apparent therefore that when it is desired to charge the battery in the vehicle from one of the charging sockets 135 as above described the connection may be made through this socket 150; and that when the battery has been removed from the vehicle and it is desired to energize it the connection may be made through one of the trolley wires 143 with this same socket without the necessity of arranging any additional connections or switches or other devices within the vehicle; and it is evident also that connections may be made to the vehicles without their batteries, through these sockets 150 from the receptacles 135, also for the purpose of moving the vehicles about within the limited range afforded by the flexible connectors.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof, it being specifically the intention of the applicant to abandon nothing of patentable novelty.

I claim as my invention:

1. In a system of electric vehicle operation, an electric vehicle having a battery compartment, interchangeable batteries of different capacities adapted for insertion into such compartment, and means for rapidly inserting and withdrawing such batteries.

2. In a system of electric vehicle operation, an electric vehicle having a battery compartment, batteries of different capacities interchangeable within such compartment, means for rapidly inserting and withdrawing such batteries, and means for efficiently transporting said batteries about.

3. In a system of electric vehicle operation, an electric vehicle having a battery compartment, a battery adapted for insertion into such compartment, another battery having different electrical characteristics from the first battery and likewise adapted for insertion into such compartment, both of said batteries being interchangeable therein, and means for rapidly inserting and withdrawing such batteries.

4. In a system of electric vehicle operation, an electric vehicle having a battery compartment, a battery, another battery having different electrical characteristics from the first battery, both of such batteries being interchangeable within such compartment, means for rapidly inserting and withdrawing such batteries, and means for efficiently transporting said batteries about outside of the vehicle.

5. In a system of electric vehicle operation, an electric vehicle having a battery compartment, battery units of different electrical characteristics but interchangeable within such compartment, means for charging the batteries of such battery units while separated from the vehicle, means for efficiently moving said battery units about between such charging means and such vehicle, and additional means for charging such batteries within the vehicle.

6. In a system of electric vehicle operation, a number of electric vehicles having battery compartments and a number of battery units of differing capacities, each battery unit including a carrier provided with means for efficiently moving it about, and each of said carriers being adapted to enter and engage in all of the battery compartments.

7. In a system of electric vehicle operation, a number of electric vehicles having battery compartments and a number of battery units of different electrical characteristics, each battery unit including a carrier having wheels and designed for efficiently transporting the battery about outside of the vehicle, all of said carriers being alike, and each of them being adapted to enter entirely into and engage in any one of the battery compartments.

8. In a system of electric vehicle operation, the combination with a battery carrier, of batteries of different linear dimensions designed for carrying in such carrier, such carrier being adapted to receive the largest battery, and means for occupying the unfilled space in such carrier when a smaller battery is carried.

9. In a system of electric vehicle operation, the combination with a battery carrier, of batteries of different linear dimensions designed for carrying in such carrier, such carrier being adapted to receive the largest battery, and a filling block adapted to occupy the unfilled space when a smaller battery is carried.

10. In a system of electric vehicle operation, an electric vehicle having a battery compartment, and interchangeable batteries of different capacities adapted for insertion into such compartments.

11. In a system of electric vehicle operation, a number of electric vehicles of different type having battery compartments, and a number of power elements of differing power characteristics readily changeable from one vehicle to another.

12. A method of handling power vehicles, consisting in providing a vehicle with a number of interchangeable power elements differing in power characteristics, selecting and temporarily equipping said vehicles with the element best suited to the immediate intended duty of said vehicle.

13. A method of handling power vehicles, consisting in providing a vehicle with a number of interchangeable power elements differing in power characteristics, selecting and equipping said vehicles with the element best suited to the immediate intended duty of said vehicle and interchanging said elements in accord with the changes in the character of the intended duty.

14. A method of handling power vehicles, consisting in providing a vehicle with a number of battery units of variable power characteristics and varying the power characteristics of said units in accordance with changes in the character of the intended duty.

15. A method of handling power vehicles, consisting in providing a plurality of vehicles of different type, providing a plurality of power elements readily insertible into any of said vehicles, and selecting for each vehicle the power element best adapted to meet the intended duty of said vehicle and equipping said vehicle with said element.

16. In a system of electric vehicle operation a number of electric vehicles of different type having duplicated battery compartments and duplicated terminals, and a number of batteries having duplicated terminals and readily changeable from any one of said vehicles to any other vehicle.

17. In a system of electric vehicle operation the combination of a number of vehicles of different type having duplicated power source receiving compartments and duplicated connections in said compartments for attachment to power sources inserted therein and a number of power sources readily changeable from any one of said vehicles to any other vehicle and each fitting said compartments and having connections engaging the connections in any of said compartments in which it may be inserted.

18. A method of handling electric vehicles consisting in providing a plurality of electric vehicles of different type having duplicated power source receiving chambers and duplicated connections for attachment to power sources to be inserted in said chambers, providing also a plurality of power elements readily insertible into any of the compartments in any of said vehicles of different type and having connections connecting with the connections in said compartments, and temporarily positioning said power sources in said vehicles and subsequently removing them for use indiscriminately in other vehicles or in the same vehicles.

In witness whereof, I have hereunto subscribed my name in the presence of two witnesses this 7th day of November, 1913.

JOSEPH M. KLINGELSMITH.

Witnesses:
LILLIAN E. CHRISTIANSON,
MARCUS A. HIRSCHL.